United States Patent [19]

Groult et al.

[11] 4,208,505

[45] Jun. 17, 1980

[54] HETEROCYCLIC AROMATIC POLYMERS OF THE POLYIMIDAZOPYRROLONE CLASS, THEIR PREPOLYMERS AND THEIR PREPARATION

[75] Inventors: Alain M. M. Groult, Ambilly; Hervé N. Tournier, Valleiry; Philippe Fayet, Ramonville Saint Agne, all of France

[73] Assignee: Centre National d'Etudes Spatiales, Paris, France

[21] Appl. No.: 832,017

[22] Filed: Sep. 9, 1977

[51] Int. Cl.² .................. C08G 69/12; C08G 77/26
[52] U.S. Cl. .................. 528/30; 260/30.2; 260/32.6 NA; 260/37 N; 428/474; 525/420; 525/432; 528/38; 528/41; 528/172; 528/173; 528/220; 528/327; 528/321; 528/328; 528/331
[58] Field of Search .......... 260/78 A, 47 CZ, 63 N; 528/327, 328, 331, 220, 172, 30

[56] References Cited

U.S. PATENT DOCUMENTS 3,637,594   1/1972   Gallus et al. ............... 260/78 A

FOREIGN PATENT DOCUMENTS 48-7314677 of 1973 Japan.

*Primary Examiner*—Harold D. Anderson
*Attorney, Agent, or Firm*—Neil F. Markva

[57] ABSTRACT

Long-chain polymeric polyimidazopyrrolones (also referred to as pyrrones) have macromolecular chains of the formula:

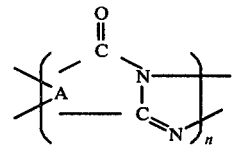

where A is a tetravalent organic radical and n is a large whole number. The polymers have film-forming properties and can be used in the production of laminates or composite materials, for example, friction pads.

18 Claims, No Drawings

HETEROCYCLIC AROMATIC POLYMERS OF THE POLYIMIDAZOPYRROLONE CLASS, THEIR PREPOLYMERS AND THEIR PREPARATION

This invention relates to heterocyclic aromatic polymers of the polyimidazopyrrolone class, their prepolymers and their preparation.

The polymers of the polyimidazopyrrolone class (also called pyrrones) and their prepolymers are known; see for example French Patent Specification No. 1,429,425. These polymers are prepared in the standard manner by cyclopolycondensation reactions between two tetrafunctional monomers such as a dianhydride of a tetracarboxylic acid and a tetramine of which the amino groups are in the ortho position if the amine is aromatic. Whatever the monomers which are employed and the process used to obtain polyimidazopyrrolones from them, it is necessary to respect scrupulously the stoichiometric relation between the two monomers taking part in the reaction, which implies a meticulous purification of the starting monomers. This purification operation is always delicate, especially in the case of tetramines which are carcinogenic products.

It would thus be advantageous to have a process for the preparation of polyimidazopyrrolones permitting the omission of the above-mentioned purification operation, at the same time producing final polymers having superior properties.

This invention has an object the meeting of this need by supplying new processes for the preparation of heterocyclic aromatic polymers of the polyimidazopyrrolone class and their prepolymers, by the autocondensation of a polyfunctional monomer of suitable structure.

A further object of the invention is the provision of new heterocyclic aromatic polymers of the polyimidazopyrrolone class which are thermally stable, have good mechanical properties and an excellent dimensional stability when they are used in the form of a thin film, as well as prepolymers of these polymers which are easily formed into an article of any desired shape before being converted into the final polymer.

The invention provides new polymers of the polyimidazopyrrolone class, characterised in that they are made up of recurring units forming macromolecular chains, said units being of the following general formula:

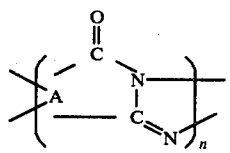

in which A is an organic tetravalent radical which is an aromatic radical, a heterocyclic aromatic radical or a heterocyclic radical containing at least 6 carbon atoms, preferably between 6 and 15 carbon atoms, and of which the four chain-forming bonds are carried in pairs by adjacent carbon atoms, (ortho position), and n is a large number.

For example, A may be selected from amongst the following radicals:

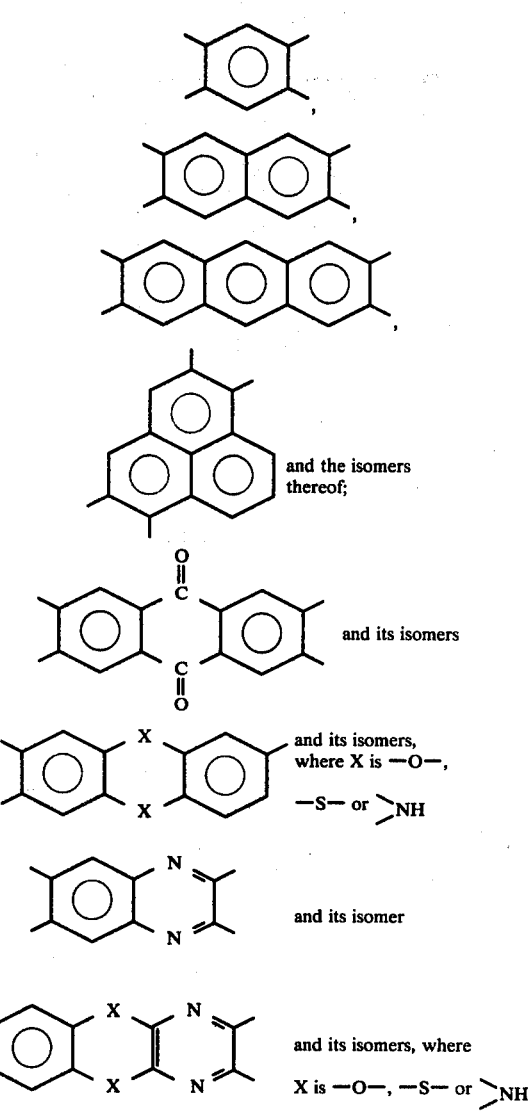

Preferably, the tetravalent group A is chosen from the radicals having the following general formula:

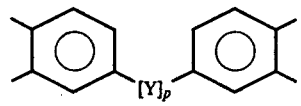

and its isomers in other positions such as for example,

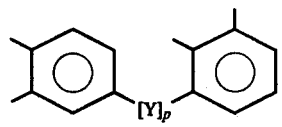

where Y is an atom or a bivalent organic radical and p is 0 or 1. For the obtaining of a polyimidazopyrrolone having the highest possible thermal, physical, chemical and mechanical properties, Y is selected from alkylene groups having from 1 to 3 carbon atoms, perfluoroalkylene groups having from 1 to 3 carbon atoms and —O—, —S—, —SO₂—,

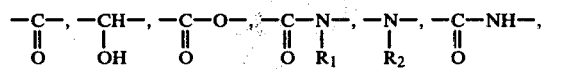

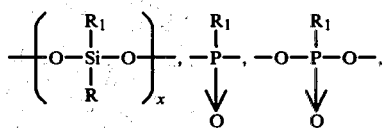

a bivalent cycloaliphatic group having from 3 to 20 carbon atoms, a bivalent aromatic group, a heterocyclic or aromatic heterocyclic group; $R_1$ and $R_2$ represent an alkyl group or alkoxy group having at the most 20 carbon atoms, or a phenyl or phenoxy group, and x is a whole number at the most equal to 3.

The polymers according to this invention are characterised by the presence of a repeated unit consisting of aromatic nuclei of at least 6 carbon atoms, having preferably 6 to 15 carbon atoms condensed with the heterocyclic system 5-ceto-[1,2a]-pyrrolo-imidazole

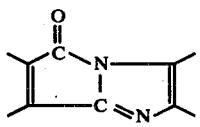

This invention also provides a process for the preparation of the above-mentioned polyimidazopyrrolones and their prepolymers, characterised in that it consists of homopolymerisation autocondensation of an organic monomer having one of the general following formulae:

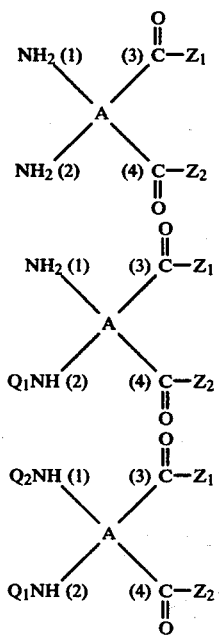
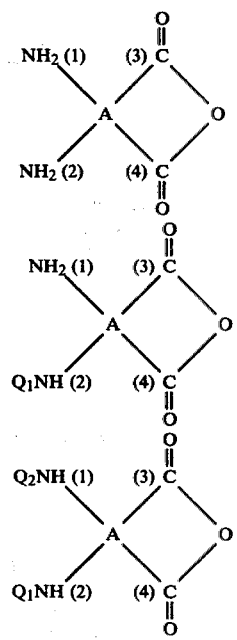

or a salt, such as a chlorhydrate, of one of these monomers, in which A is as described above; $Q_1$ and $Q_2$ designate two protector groups, similar or different, of the amino function, for example an aliphatic or aromatic acyl group, in particular an acetyl group; $Z_1$ and $Z_2$ represent a monovalent organic radical which can be of a hydroxyl group or a hydroxyl derivative such as an $OR_3$ group in which $R_3$ is an alkyl group, a phenyl or benzyl group; or a halogen atom, such as chlorine; the bonds (1) and (2) of the amino groups or the groups derived from the amino function being carried by two adjacent carbon atoms (the ortho position of the aromatic radical) and the two carbonyl groups of bonds (3) and (4) being also carried by two carbon atoms in the ortho position.

The autocondensation of a given monomer into polyimidazopyrrolone can be carried out according to any one of the following processes:
polymerisation in an organic solvent,
polymerisation of the monomer under pressure with heat, and
polymerisation in the presence of a dehydration agent.

The autocondensation polymerisation reaction in an organic solvent constitutes the preferred method of operation of the process. The reaction is carried out in two distinct stages:

The first consists of a polycondensation which allows the obtaining of a soluble film-forming prepolymer, the structure of which is principally that of a polyaminocarboxyamide with some polycarboxybenzimidazole and polyaminoimide groups.

The second consists in transforming this intermediate polymer into polyimidazopyrrolone by intramolecular cyclisation carried out simply by heating or under the action of a suitable chemical dehydrating agent. Preferably, the cyclisation reaction is carried out by heating after forming the intermediate product into a shape which corresponds to the shape that is desired to be conferred to the final product (films, composites, laquers, enamels, etc.).

The substituted polyamide obtained from the first autocondensation polymerisation comprises a macromolecular chain of recurring units of the general formula:

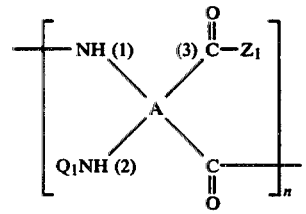

where A, $Q_1$ and $Z_1$ are as described above, and n is a whole number that is sufficiently high for the prepolymer to have film-forming properties. The thermal or chemical cyclisation of this prepolymer leads to the production of a polyimidazopyrrolone of which the recurring unit has the general following formula:

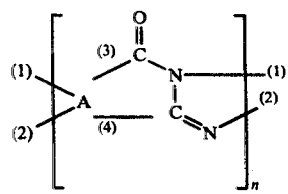

As a general rule the polymerisation reaction is preferably conducted in a liquid medium. The solvent which can be used for the polymerisation reaction has functional groups which do not react with those of the monomer. The organic solvent not only has to be inert but is preferably a solvent for the polymerisation product, as well as for the monomer. Normally organic solvents of the N,N,-dialkyl-carboxylamide class can be used as solvents in the process according to this invention.

The preferred solvents are those of low molecular weight of this class, in particular, N,N-diethylformamide and N,N-dimethylacetamide. These solvents can be easily extracted from the prepolymer and/or from articles formed from the prepolymers, by evaporation, displacement or diffusion. Other typical solvents of this class are: N,N-diethylacetamide, N,N-dimethylmethoxy acetamide, and N-methylcaprolactam. Further solvents which can be used are the following: dimethylmethsulphoxide, N-methyl-2-pyrrolidone, tetramethylene urea, pyridine, dimethylsulphone, hexamethyl phosphoramide, polyphosphoric acid, tetramethylene sulphone, formamide, N-methylformamide and N-acetyl-2-pyrrolidone.

The solvents may be used alone, mixed with one another or with less satisfactory solvents, such as benzene, benzonitrile, dioxane, butyro-lactone, xylene, toluene, and cyclohexane.

The quantity of solvent to be used is not particularly important, but in most cases it is preferable that it does not exceed fifty times the weight of the monomer. Polymerisation is carried out for preference under an inert atmosphere such as, for example, under dry nitrogen.

The length of time and the temperature of the reaction necessary to obtain the prepolymer of substituted polyamide are dependent on the solvents which are used and on the nature of the monomer. A reaction temperature lower than 200° C. is desirable, but preferably the prepolymerisation is effected at a temperature between minus 20° C.+40° C. if it is desired to avoid all cyclisation reactions and/or formation of gels. The degree of polymerisation of the polyamide prepolymers can be regulated at will by acting on the different polymerisation parameters by utilising a chain terminating agent such as an aromatic anhydride or an aromatic diamine.

In a second preparation process according to the invention, a prepolymer is prepared in solution by reducing the $NO_2$ group of a suitable ortho-nitroamino polymer to obtain an $NH_2$ group and simultaneously autocondensing in situ the resulting product to obtain the prepolymer. The ortho-nitroamine monomers which are suitable are those having the following general formulae:

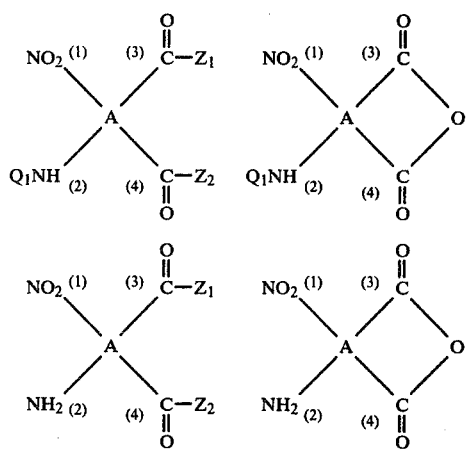

as well as the salts such as, for example, the chloralhydrates. In the formulae A, $Q_1$, $Z_1$, $Z_2$ and the bonds (1), (2), (3) and (4) are as mentioned previously. Preferably, the monomers in which the tetravalent radical A has the following general formula are used:

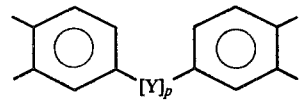

or its isomers, where Y and p are as previously described. Advantageously, an ortho-nitroamine derivative of the following general formula will be used as the monomer:

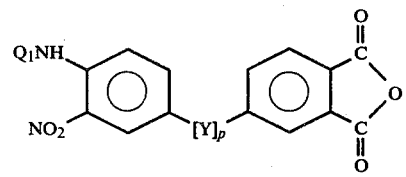

It is to be noted that the monomers used in the second process are the intermediate products of the synthesis of the diamino monomers employed in the first process described above.

An important feature of the second method of obtaining a prepolymer of polyimidazopyrrolone starting from the ortho-nitroamine derivatives is that the reduction of the $-NO_2$ group to obtain an $-NH_2$ group and the autocondensation of the monomer thus formed in situ are carried out simultaneously and permit the obtaining of a prepolymer in accordance with the invention.

Any known processes for reducing $-NO_2$ to $-NH_2$ in an anhydrous medium can be used, but it is preferable to carry out catalytic reduction of the monomer in an appropriate solvent selected from the inert solvents mentioned above with respect to the first process.

Highly polar solvents and anhydrous solvents are particularly suitable, particularly N,N-dimethylformamide, and N,N-dimethylacetamide, and N-methyl-2-pyrrolidone.

The hydrogenation catalyst is selected from those which are suitable for the catalytic reduction of $-NO_2$ groups to $-NH_2$ groups, paladinised carbon at an amount of 5% Pd:C being particularly suitable for this reaction. The proportion of catalyst to be used is calculated according to the quantity of the product to be hydrogenated. Generally a proportion of about 1% of the catalyst in relation to the product to be reduced proves satisfactory.

The reaction conditions are selected in such a manner that reduction of the —NO$_2$ groups will be quantitative and that the autocondensation of the amino derivative thus obtained is effected simultaneously giving a solution of the prepolymer of the polyimidazopyrrolone of high molecular weight as linearly as possible and with a concentration of dry ingredients which will be suitable for the use envisaged.

The hydrogen pressure is not particularly critical but it is preferable that it should exceed ten atmospheres, and preferably lies between forty and eighty atmospheres. The reaction temperature plays a large part in determining the quality of the prepolymer of the polyimidazopyrrolone thus obtained. Any temperature above 20° C. can be used but it is desirable to select, according to the nature of the reaction solvent, a temperature lying between 60° and 120° C. The duration of the reaction should be sufficient to ensure complete reduction and autocondensation of the monomer. Generally it will lie between two and forty-eight hours.

It is necessary to use anhydrous solvents. As the reducing action of the —NO$_2$ groups by the hydrogen liberates two molecules of water per nitro group, it is necessary to use, at the start of the reaction, a moderate solid dehydration agent to effect water absorption, that is not soluble in the reaction medium and is inert with regard to the reaction medium. Molecular sieves are particularly suited for this purpose. In the absence of such an agent, the water liberated at the start of the reduction will cause hydrolysis and the polymerisation will be carried out under inferior conditions. The concentration of the product to be hydrogenated in the reaction solvent generally lies between 5 and 40% by weight.

The catalyst and the molecular sieves are eliminated from the prepolymer solution by any standard technique, for example, by filtration on fritted glass.

Whatever the application envisaged for the prepolymer of the polyimidazopyrrolone, it is desirable that its degree of polymerisation (molecular weight) should be such that the inherent viscosity of this polymer is at least equal to 0.1 and preferably lies between 0.3 and 3.

To form a film of polyimidazopyrrolone, a prepolymer solution in an appropriate solvent is employed and, whatever the preparation process of this prepolymer might be, standard techniques are used.

Solutions of polyimidazopyrrolone prepolymer have also other applications, in particular for the manufacture of composite materials of which they constitute the joining element, the reinforcing element being principally glass fibres, boron fibres, and carbon and graphite fibres, etc.

Polyimidazopyrrolone polymers are equally useful in the solid state in many different applications such as, for example, the fabrication of structural composite materials, composite materials with a low frictional coefficient and, in the solution state, in various solvents for various usages.

Polyimidazopyrrolones can also be mixed with prepolymers of known polyimides to obtain mixes which can be cyclised into materials having properties superior to those of the polyimidazopyrrolones or the polyimides taken by themselves.

To effect the cyclisation of a film of prepolymer into polyimidazopyrrolone, the film is subjected to a progressive heating according to a temperature programme determined under an inert atmosphere whilst applying or not applying a mechanical tension to the film.

A thermal cyclisation process is equally applicable to convert the prepolymer into a final polymer in a form other than a film. Cyclisation into polyimidazopyrrolone can also be carried out chemically, for example, with a strong dehydrating agent such as P$_2$O$_5$.

Two other forms of operating the process (polymerisation by pressure under the action of heat and polymerisation in the presence of a dehydrating agent) permit the direct obtaining of the polyimidazopyrrolone in its cyclised form.

According to one of the two other forms of operating the process, autocondensation of the monomer is carried out in a reaction medium containing a powerful dehydrating agent such as, for example, polyphosphoric acid, at a temperature between 100° and 350° C.

According to the other of these two forms of operating, the autocondensation reaction is carried out by heating the monomer at a temperature between 240° and 380° C., in the absence of a solvent and for a period of between one and twenty-four hours.

The following non-restrictive examples are given with a view to illustrating the invention:

EXAMPLE I

This example relates to the preparation of a film of polyimidazopyrrolone by autopolymerisation hydrogenation in solution of the following monomer:

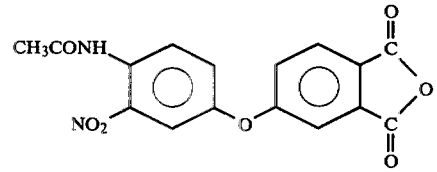

(1) Description of the synthesis of the monomer:

(A) Synthesis of 4'-amino-3,4-dicarboxydiphenylether:

(a) Synthesis of 4'-nitro-3,4 dimethyl-diphenylether:

This synthesis is done by condensation in an alkaline medium of 3,4-dimethyl-phenol and paranitrochlorobenzene according to the following equation:

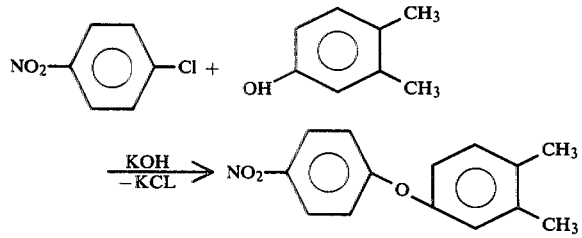

In a three-necked round-bottomed flask provided with an agitator and an air cooler, a mixture of 0.164 moles of para-nitrochlorobenzene (Melting Point 82° to 84° C.) and 0.164 moles of 3,4-dimethyl-phenol (Melting Point 64° to 66° C.), was liquified by heating to 90° C.

To this melted mixture there was progressively added, during refrigeration by air and rapid agitation, 0.164 moles of potassium hydroxide in the form of pellets. The temperature was raised and maintained at 125° to 130° C.

The addition of the potassium hydroxide took place over a period of one hour and heating was prolonged for a period of three hours at the prescribed temperature.

The condensation product is isolated by fractional distillation under vacuum of the reaction mixture, eliminating the "head" of the distillate (i.e. the fraction passing over at 80° to 90° C. under 0.2 mm of mercury). This "head" fraction essentially comprises the para-nitrochlorobenzene which has not reacted. A yield of over 40% is obtained of the pure product melting at 88° to 89° C. (on crystallisation from alcohol).

(b) Synthesis of 4'-nitro-3,4-dicarboxy-diphenylether

4'-nitro-3,4-dicarboxy-diphenylether is prepared by the oxidation of 4'-nitro-3,4-dimethyldiphenylether. It is extremely difficult to oxidise an orthodimethylated derivative directly into an orthodicarboxylic derivative. The reaction proceeds in two steps:

1st step: mono-oxidation of a —CH$_3$ group to a —COOH group

2nd step: oxidation of the mono-oxidised derivative.

The first step can be shown schematically by the following reaction:

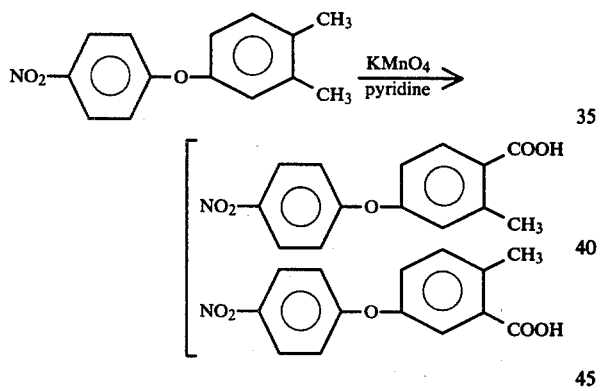

Oxidation by KMnO$_4$/pyridine has the following advantages:
  the pyridine serves as a solvent,
  the pyridine serves as an alkaline agent for the oxidation,
  the pyridine serves as a neutralisation agent for the —COOH group obtained by oxidation.

In a three-necked round-bottomed flask of 500 ml. volume, furnished with an agitator and refrigerated, there are introduced successively:
  25.0 grms. 4'-nitro-3,4-dimethyl-diphenylether,
  70.0 grms. pyridine,
  70.0 grms. water.

The temperature of the suspension is raised to 100° C. (using a water bath), and there is added over ten hours and in small quantities, whilst stirring well, 91.0 grms. of finely ground KMnO$_4$. When the addition is finished, the suspension is stirred for two hours at this temperature. The reaction mixture is filtered hot on a Büchner filter. The precipitate of MnO$_2$ is washed three times with a little warm aqueous pyridine (one to one mixture). The cold filtrate is acidified by concentrated hydrochloric acid up to pH 3. A viscous product separates which solidifies after a few hours. The crystals thus obtained are filtered off. The solid product is treated with an aqueous solution of 50% NaOH in order to remove the nonoxidised products. The plan of operation is as follows:

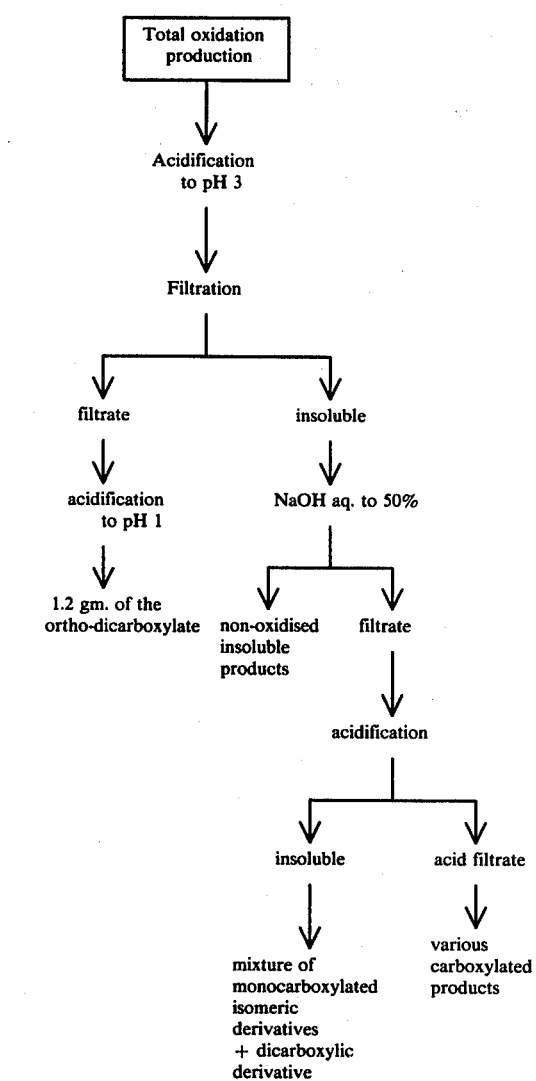

The monocarboxylic and dicarboxylic derivatives are identified by titration from the carboxylic functional content.

The second stage of the reaction consist of oxidation of the monocarboxylic isomeric derivatives previously obtained.

This oxidation is represented by the following equation:

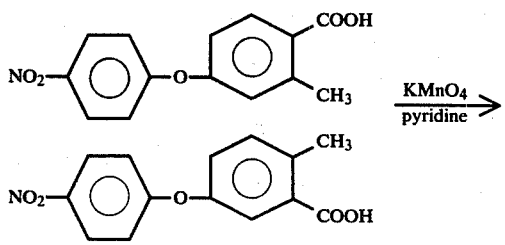

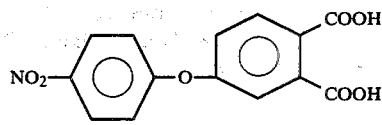

The oxidation technique is the same as that which has been mentioned for the mono-oxidation process. There is obtained a good yield (70 to 80%) of 4′-nitro-3,4-dicarboxy-diphenylether. After recrystallisation in aqueus ethanol, a pure product is obtained melting at 178° to 179° C. This product is identified by its carboxylic functional content and by elementary analysis of the nitrogen for $C_{14}H_9NO_7$ (M.W. 303.0); calculated percentage N equals 4.62, percentage N found equals 4.60.

(c) Synthesis of 4′-amino-3,4-dicarboxy-diphenylether

The preparation of the amino-4-dicarboxy-3,4-diphenylether is carried out by the catalytic reduction of 4′-nitro-3,4-dicarboxy-diphenylether according to the following reaction:

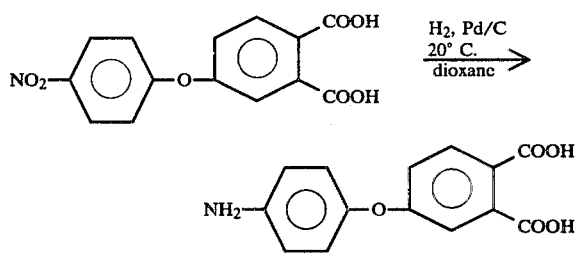

In a glass autoclave, there is dissolved 64.0 grms. of 4′-nitro-3,4-dicarboxy-diphenylether in 2500 ml. of anhydrous dioxane. The mixture is subsequently hydrogenated at 20° C. in the presence of 5 grms. of Pd catalyst at 5% by weight on active carbon. The hydrogen pressure is 22 atmospheres and the duration of the operation is 20 hours. It can be seen, as the hydrogenation is effected, that the black catalyst becomes more and more grey.

The 4′-amino-3,4-dicarboxy-diphenylether which is formed is insoluble in dioxane and is deposited on the catalyst so that it is not necessary to avaporate the dioxane; it suffices only to filter on paper to obtain the mixture of 4′-amino-3,4-dicarboxy-diphenylether and the catalyst. The yield is practically quantitative of the non-polymerised product.

It is not essential to separate the catalyst from the di-basic acid at this stage of the synthesis; in fact this separation can be easily done after the following step.

(d) Synthesis of anhydrous 4′-acetamido-3,4-dicarboxy-diphenylether

Anhydrous 4′-acetamido-3,4-dicarboxy-diphenylether is prepared by mono-acetylation and dehydration carried out simultaneously on 4′-amino-3,4-dicarboxy-diphenylether. This reaction is represented by the following equation:

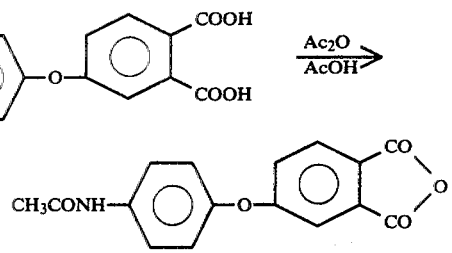

Into a flask there is introduced successively:
42.0 grms. of the di-basic acid mixture (37.5 grms., 0.137 moles)+catalyst (4.5 grms.),
56 ml. of acetic anhydride,
150 ml. of glacial acetic acid.

After three hours of heating with a reflux condensor, the mixture is filtered hot to eliminate the catalyst (Pd/C of the preceding step).

A little warm acetic acid is used for rinsing. The anhydrous 4′-acetamido-3,4-dicarboxy-diphenylether crystallises out after the filtrate cools. The white crystals are filtered and washed in petroleum ether. They are dried under a vacuum at ambient temperature. 27.8 grms. are obtained (a yield of 68%) of pure product with a melting point of 199° to 201° C.

The infra-red spectrum of the product conforms with the following structure:

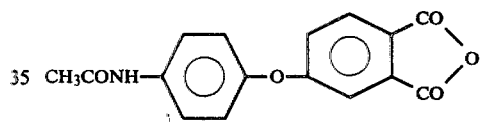

two absorption bands $>C=O$ (anhydride group) at 1845 cm$^{-1}$ and 1782 cm$^{-1}$; secondary amide (—NH-free) at 3300 cm$^{-1}$; and $>C=O$ absorption at 1662 cm$^{-1}$.

(e) Synthesis of 3′-nitro-4′-acetamido-3,4-dicarboxy-diphenylether

This synthesis takes place by nitration of 4′acetamido-3,4-dicarboxy-diphenylether anhydride and is represented by the following equation:

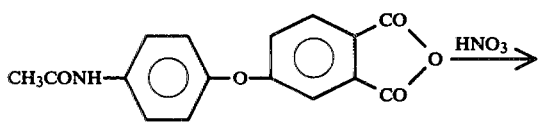

4′-acetamido-3,4-dicarboxy-diphenylether anhydride

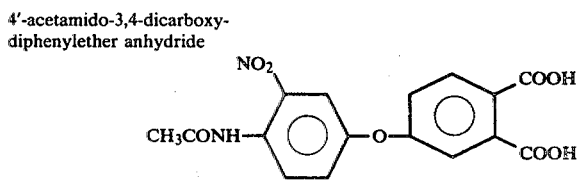

3′-nitro-4′-acetamido-3,4 dicarboxy-diphenylether

There is introduced successively into a 50 ml. reactor:

1.0 grms. of 4'-acetamido-3,4-dicarboxy-diphenylether,
1750 ml. of glacial acetic acid,
1750 ml. of pure acetic anhydride,
2.0 ml. of concentrated $H_2SO_4$,
0.050 grms. of $NaNO_2$.

To this mixture, when it has been cooled to 10° C., 1.0 ml. of concentrated nitric acid is added. This is left to react for two hours at ambient temperature. It is then poured into an ice/water mixture. The reaction product is filtered and washed with water until the washing water is neutral. The crude nitro derivative is re-crystallised in aqueous methanol (by dissolving in warm methanol and then reprecipitating in water). 0.6 grms. of a yellow product is obtained melting at 130° to 133° C. with gaseous evolution.

Yield 85% gross product,
Melting Point equals 129° to 132° C.
Nitrogen analysis N%: calculated equals 7.77% actually found equals 7.46%.

Infra-red spectra of the product corresponds to the structure given above:

Acid = longitudinal vibration of —OH = strong absorption in the 3500 $cm^{-1}$ range. >C=O vibration = 1705 $cm^{-1}$.

Secondary amide free -NH = 3350 $cm^{-1}$. >C=O absorption = 1677 $cm^{-1}$ $$C-NO_2 = \begin{cases} 1505 \text{ cm}^{-1} \\ 1345 \text{ cm}^{-1} \end{cases}$$

(f) Synthesis of 3'-nitro-4'-acetamido-3,4-dicarboxy-diphenylether

This preparation is carried out by heating in a reflux condenser 3'-nitro-4'-acetamido-3,4-dicarboxy-diphenylether in acetic anhydride according to the following equation:-

[Chemical structure: 3'-nitro-4'-acetamido-3,4-dicarboxy-diphenylether + Ac₂O →]

3'-nitro-4'-acetamido-3,4-dicarboxy-diphenylether

[Chemical structure: 3'-nitro-4'-acetamido-3,4-dicarboxy-diphenylether anhydride]

3'-nitro-4'-acetamido-3,4-dicarboxy-diphenylether 40 grms. of 3'-nitro-4'-acetamido-3,4-dicarboxy-diphenylether are dissolved in 80 ml. of glacial acetic acid and 24 ml. of acetic anhydride and heated in a reflux condenser for two hours. After cooling the solution, the crystals formed are washed with acetic acid, dissolved in 200 ml. of acetic acid, brought to the boil and treated with active carbon for 1 to 2 hours. The solution is filtered warm and, after cooling, the clear yellow crystals obtained are washed in hexane and dried under reduced pressure.

Weight of the product obtained = 19.35 grms.
Yield = 51%.
Melting Point = 162.5° to 163° C.

Evaporation to dryness of the filtrate permits the obtaining of a quantitative yield of the desired product.

The infra-red spectra is in accordance with the expected structure

Two absorption bands at 1853 $cm^{-1}$ and 1762 $cm^{-1}$. (>C=O of the anhydride function).

Secondary amide free —NH = 3360 $cm^{-1}$. >C=O absorption = 1695 $cm^{-1}$.

$$C-NO_2 \text{ group} = 1500 \text{ cm}^{-1}$$
$$1340 \text{ cm}^{-1}$$

intense absorption band C—O—C (aryl ether) = 1260 $cm^{-1}$.

Elementary Analysis. Calculated: Carbon % 56.14 Hydrogen % 2.92 Nitrogen % 8.18. Actually Found: Carbon % 54.47 Hydrogen % 2.86 Nitrogen % 8.17.

(2) Preparation of the polyimidazopyrrolone prepolymer

This preparation is carried out by reduction and simultaneously auto-condensation of 3'-nitro-4'-acetamido-3,4-dicarboxy-diphenylether anhydride (monomer) according to the following equation:-

[Chemical structure showing reduction with H₂, catalyst, -H₂O to give polymer with AcNH, NH, CO, COOH groups]

10 grms. of 3'-nitro-4'-3'-nitro-4'acetamido-3,4-dicarboxy-diphenylether anhydride, 400 $cm^3$ anhydrous dimethylacetamide and 1.5 grms of palladium carbon (catalyst) (5% by weight palladium) are placed in regenerated molecular sieve (Union Carbide 4 A) to absorb the water formed in the reaction. After having evacuated the vessel, hydrogen is introduced into the vessel up to a pressure of 50 atmospheres, the temperature of the vessel is raised to 90° C. and it is left to react for 24 hours. After releasing the $H_2$ pressure, the vessel is opened and its contents are collected. In this way, a solution of prepolymer is obtained in dimethylacetamide, containing also the catalyst and the molecular sieve.

(3) Obtaining a polyimidazopyrrolone film

The solution of prepolymer in DMAc obtained in (2) is filtered on a glass filter under nitrogen to eliminate the catalyst and the molecular sieve.

The DMAc is evaporated under reduced pressure (0.1 mm. of mercury) at 80° C.: the residue is dissolved in N-methyl-2-pyrrolidone (NMP) in such a manner as to obtain a 20% solution by weight which has a suitable viscosity to enable it to be laid out as a film. The viscous solution of the prepolymer is then spread out as a thin layer of uniform thickness (300 microns) on a glass support with the aid of a scraper blade. The glass support is transferred to a sealed box containing nitrogen and the whole is then placed in an oven. During the entire thermal treatment, a current of nitrogen is maintained in the box (10 l/hour). The oven is heated according to the following programme:

24 hours at 100° C.,
24 hours at 150° C.,
24 hours at 200° C.,
2 hours at 250° C.,
2 hours at 300° C., and
1 hour at 350° C.

After slow cooling, the film is separated from its support by simply immersing in water. The film thus obtained is brownish-red and flexible.

It also has good mechanical properties at ambient temperature. Thus a sample of 25 microns thickness has a breakage resistance of 6.9 kg/mm², an elongation at break of 1.7%, and an elastic modulus of 385 kg/mm². It also has good thermal stability, as determined by dynamic thermogravimetric analysis (3° C./minute), as much in air as in nitrogen, up to temperatures in the order of 400° C.

Examples II to IV which follow illustrate schematically the preparation of other monomers capable of being poly-condensed, preferably in an inert solvent, the prepolymers being capable of being formed to the desired shape, then cyclised into polyimidazopyrrolones in accordance with the operating method described in Example I, Part 3.

EXAMPLE II

Preparation of the monomer—3′,4′-diacetamido-3,4-dicarboxy-benzophenone of the following formula:

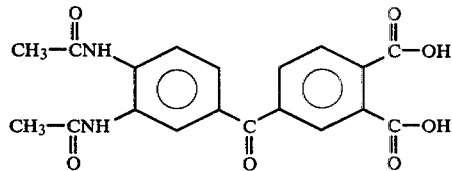

(a) Synthesis of 3,4-dimethyl-3′,4′-dinitro-benzophenone

This synthesis is carried out by a condensation reaction between 3,4-dinitro-benzoyl chloride and orthoxylene according to the standard Friedel-Crafts acylation reaction:

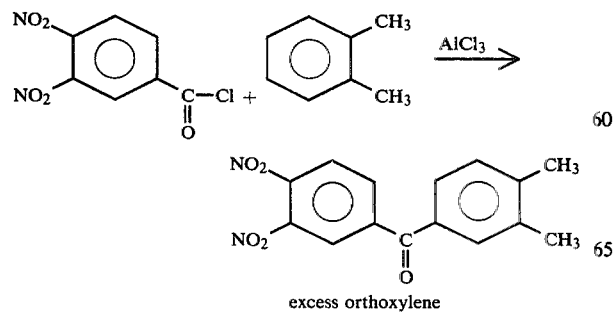

excess orthoxylene 3,4-dinitro-benzoyl chloride is prepared by chlorinating the corresponding acid by means of SOCl₂ with a quantitative yield.

There is successively introduced into a 250 ml. round-bottomed flask with three necks;
  49.0 grms. (0.213 mole) of 3,4-dinitrobenzoyl chloride,
  38.0 grms. (0.360 mole) of ortho-xylene.

This mixture is heated to dissolve the acid chloride and, when it has all been dissolved, the mixture is returned to ambient temperature. After 1 hour, 28.5 grms. (0.213 mole) of AlCl₃ are added in small quantities. When it has all been added, the mixture is subsequently heated for 4 hours at 90° C. with stirring. The aluminium chloride which has not reacted is destroyed (cooled) by the careful addition of 10% HCl.

The reaction mass is then treated by the usual methods which allow the isolation of 32.5 grms. of a pure product melting at 149° to 151° C. after two recrystallisations in aqueous acetone.

The spectral properties of the product conform to the expected structure.

(b) Synthesis of 3′,4′-dinitro-3,4-dicarboxy-benzophenone

This synthesis is carried out by oxidation of the methyl groups of the compound obtained in (a) according to the operating method in two steps described in Example I, Part 1A, b, according to the following general equation:-

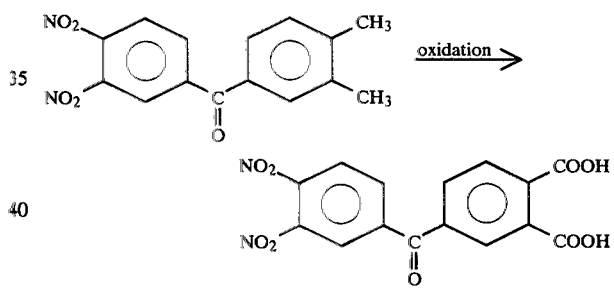

The presence of the carbonyl group makes the oxidation of the methyl groups particularly difficult. Nonetheless, the technique utilised permits the obtaining of a 25 to 30% yield of the dicarboxylated product.

(c) Synthesis of 3′,4′-diamino-3,4-dicarboxy-benzophenone

This product is prepared by the catalytic reduction in an anhydrous solvent of the —NO₂ groups of the compound obtained in (b) above to —NH₂ groups according to the following equation:

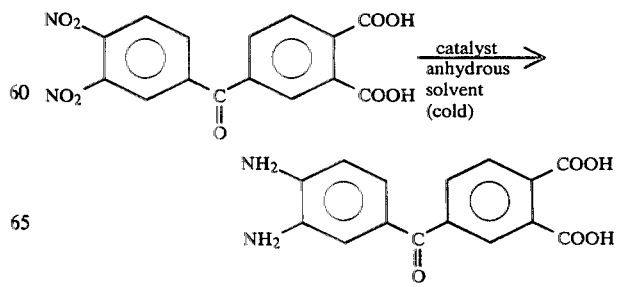

The selection of the catalytic system is very important for simultaneous reduction of the carbonyl groups is desirable, especially as these reduction products are of particular interest from the point of view of this invention.

As catalyst, a 5% by weight mixture of palladium with carbon is used in the presence of an excess of the reducing agent (cyclohexylene). The solvent used is a mixture of 1/1 of methanol and anhydrous dioxane.

It is to noted that this hydrogenation does not involve the use of hydrogen.

The compound expected is obtained with a yield of 70%.

(d) Synthesis of 3',4'-diacetamido-3,4-dicarboxy-benzophenone

This synthesis is carried out by monoacetylation of each of the two amino groups of the compound obtained in (c) above according to standard acetylation techniques using acetic anhydride.

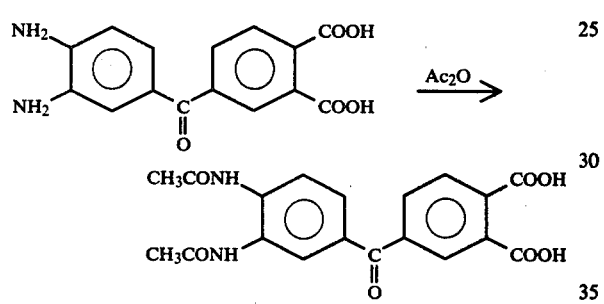

EXAMPLE III

Preparation of the anhydrous monomer of 3',4'-diacetamido-3,4-dicarboxy-benzanilide anhydride of the following formula:

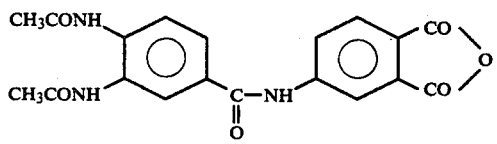

(a) Synthesis of 3',4'-dinitro-3,4-dicarboxy-benzanilide anhydride

This compound is prepared by condensation of 3,4-dinitro-benzoyl chloride with 4-amino-phthallic anhydride according to the standard preparation processes for aromatic substituted amides.

The reaction is illustrated by the following equation:

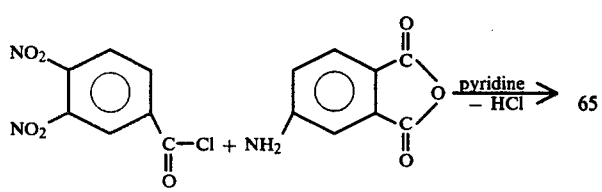

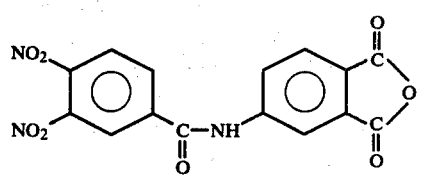

(b) Synthesis of 3',4'-diamino-3,4-dicarboxy benzanilide anhydride

This synthesis is carried out by the catalytic reduction in an anhydrous solvent (such as dioxane), of the —NO₂ groups of the compound obtained in (a) to give —NH₂ groups according to the following equation:

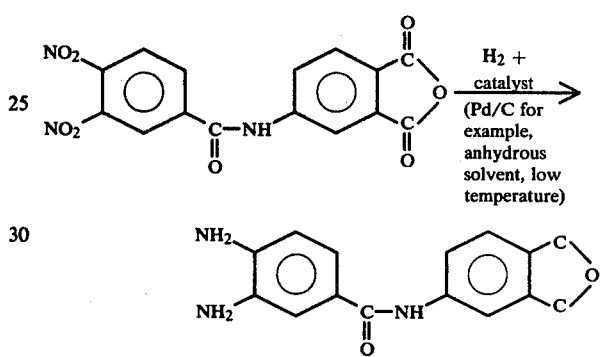

Chemical reduction with sodium dithionite in anhydrous solvent medium (for example acetone) gives equally good results.

(c) Synthesis of 3',4'-diacetamido-3,4-dicarboxy benzanilide anhydride

This synthesis is carried out by the monoacetylation of each of the two —NH₂ groups of the compound obtained at (b) above, according to the following equation:

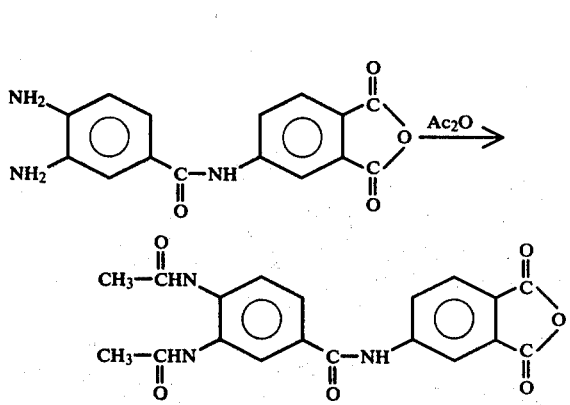

The acetylation is carried out according to normal methods.

EXAMPLE IV

Preparation of the monomer
4-(3',4'-diacetamidobenxoyloxy)-o-phthallic acid

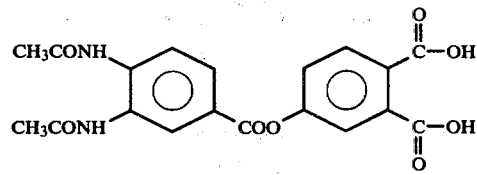

(a) Synthesis of 4(3',4'-dinitro-benzoyloxy)-o-phthallic acid

This synthesis is done by esterification of the 4-hydroxy phthallic acid using 3,4-dinitro-phthalloylchloride according to the known means of preparation of aromatic esters in the presence of an acceptor of HCl.

The reaction can be shown schematically as follows:

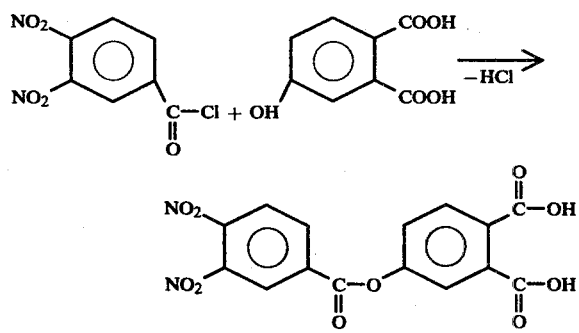

(b) Synthesis of 4-(3',4'-diamino-benzoyloxy)-o-phthallic acid

This synthesis is carried out by chemical reduction, for example by sodium dithionite in aqueous medium, of the —$NO_2$ groups of the compound obtained at (a), to give —$NH_2$ groups, according to the following equation:

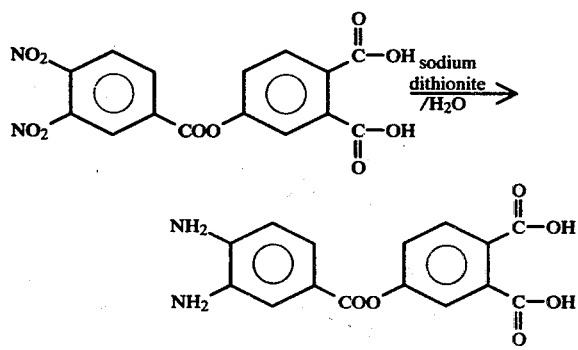

(c) Synthesis of 4-(3',4'-diacetamido-benzoyloxy)-o-phthallic acid

This synthesis is carried out by the monoacetylation of each of the —$NH_2$ groups of the compound obtained in (b) above, by the following reaction:

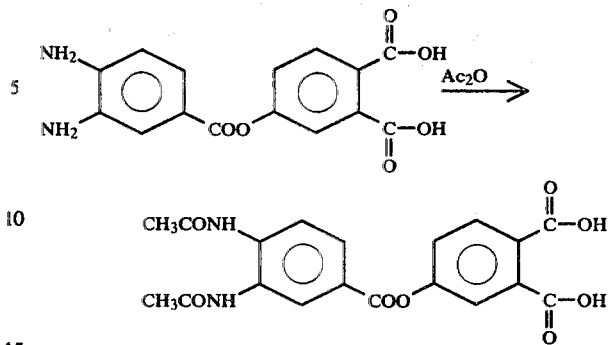

Examples V to VII which follow give some examples of the application of the prepolymers and polymers according to the invention.

EXAMPLE V

Preparation of polyimidazopyrrolone/carbon fibre composites

For the preparation of these composites, a solution is used of the prepolymer in dimethylacetamide prepared as described in Example I and containing about 50% by weight of the prepolymer. A rectangular ribbon (150×48 mm) of carbon fibre tissues [Rigilor product AGT/TS/480 sold by Carbone-Lorraine (Serofim)], having an elastic modulus of 4000 kg/mm² and a tensile strength of 170 to 220 kg/mm² is fixed to a rigid metallic support and is impregnated by means of spatula with the prepolymer solution, subjected to the following thermal pretreatment in order to eliminate the major part of the dimethylacetamide the presence of which will lead to the obtaining of a poorer structure in the final composition: drying is done under reduced pressure at 100° C. for thirty minutes, heating to 150° C. for two hours and heating at 200° . for one hour.

The ribbon is then taken from its support and cut into four strips of 12 mm. width. Besides eliminating the solvent, the thermal pretreatment confers rigidity to the inpregnated fibres, thus preventing the carbon fibres from rising up after their subsequent treatment. A strip is placed in a mould which has been well-degreased previously and coated with a mould release agent based on polytetrafluoroethelene (Hilflon), then the mould is placed in a hot hydraulic press. The temperature of the mould is raised to 275° to 280° C. under low pressure then a pressure is applied of about 150 kg/cm². The pressure is released when the resin has flowed towards the ends of the mould. This operation is repeated seven times in about thirty minutes. The first cycle of pressing is carried out at 275° to 280° C. because, at this temperature, the resin exhibits a very sharp tendency to liquify, thus permitting good moulding of the carbon fibres in spite of the relatively small amount of residual dimethylacetamide. During the successive pressure reliefs, separation of the volatile matter can be observed (water, acetic acid and dimethulacetamide) which diminishes towards the end of the cycle. These pressure reliefs are indespensible to avoid gas being imprisoned in the final composite and thus conferring on it an excessively poorer structure. The temperature is raised to 375° to 380° C. and a pressure of 150 kg/cm² is applied. Subsequently the pressure is released progressively in the space of about forty five minutes at the same time maintaining the temperature. The mould is stripped hot and the sample thus obtained is slowly cooled in a drying stove just at ambient temperature in order to avoid any thermal shock which may cause damage. In the course of the pressing at 375° to 380° C. escape of volatile matter can no longer be observed (end of cyclisation). It is important to carry out the stripping of the mould hot for, if the sample is allowed to cool in the mould, delamination of the composite is produced, probably due to the different rates of contraction of the mould and of the composite during cooling.

Preferably, after cooling, a thermal after-treatment under nitrogen at 220° C. is carried out for a period of sixteen hours. This after-treatment appears to improve the mechanical properties of the composites, even though their appearance is not effected by this treatment.

Measurements of mechanical characteristics have been carried out on several composite samples prepared as described above and containing 55 to 63.6% by volume of carbon fibres in relation to the total volume of the sample. The measured characteristics have been flexural modulus E, tensile flexural strength F, and resistance to shear C. The results obtained are listed in the table below.

| No. of sample | Quantity of carbon fibres % by volume | E, kg/mm$^2$ | $\sigma_F$, kg/mm$^2$ | $\sigma_C$, kg/mm$^2$ |
|---|---|---|---|---|
| 1 | 55 | 13500 | 71 | 4.3 |
| 2 | 62.8 | 16500 | 87.5 | 4.3 |
| 3 | 63.1 | 16500 | 75.5 | 4.15 |
| 4 | 63.6 | 15400 | 86 | 5 |
| 5 | 61.8 | 16300 | 94 | 4.35 |
| 6 | 62 | 16300 | 79 | 4.9 |
| 7 | 62.6 | 15800 | 75 | 4.9 |
| 8 | 60.7 | 15000 | 77 | 4.55 |
| 9 | 56.6 | 13500 | 71.5 | 4.3 |
| 10 | 62 | — | 87 | — |
| 11 | 55 | — | 85 | — |

The flexing tests have been carried out with a distance between the supports of 40 mm. and a deformation rate of 1 mm./minute. The shear tests have been carried out with a distance between the supports of 10 mm. and a deformation rate of 1 mm./minute.

EXAMPLE VI

Preparation of composites made from a mixture of a polyimide and a polyimidazopyrrolone with carbon fibres Starting from polyimidazopyrrolone prepolymer in a 50% solution in dimethylacetamide, prepared as described in Example 1, and with "kerimid 601" K 1050 (a polyamino-bis-maleimide) sold by Rhone-Poulenc and used in the form of a solution in dimethylacetamide, mixtures in various proportions are prepared according to the following method:

Two solutions are mixed at 50° to 60° C. under nitrogen whilst stirring well for a period of fifteen minutes with the aid of a magnetic agitator in order to ensure the homogeneity of the mixture. The mixtures obtained are directly used for the manufacture of composites with carbon fibres, according to the same operating method as described for Example V.

The tensile strength on flexing has been determined for the sample composites obtained and the porosity $V_p$. The results are listed in the table below which also gives as a comparison the results obtained by using the polyimidazopyrrolone prepolymer by itself and the kerimid 601 by itself.

| Sample No. | Proportion by Weight | | Quantity of carbon fibres, % by volume | $\sigma_F$ kg/mm$^2$ | $V_p$ % Porosity |
|---|---|---|---|---|---|
| | Polyimidazopyrrolone Example I | Kerimid 601 | | | |
| 1 (tensile) | 100% | 0% | 62 | 87 | 11 |
| 2 | 75% | 25% | 61 | 86 | 9.5% |
| 3 | 50% | 50% | 59.3 | 92 | 8% |
| 4 | 25% | 75% | 64 | 111 | 11% |
| 5 (tensile) | 0% | 100% | 68 | 104 | 12% |

These results show that the mixture of 25% of polyimidazopyrrolone and 75% of Kerimid 601 together with carbon fibres gives a composite which has very interesting properties with respect to resistance to breakage on flexing, superior to those obtained with Kerimid 601 or polyimidazopyrrolone by themselves.

EXAMPLE VII

Preparation of composite friction materials

Friction materials are prepared starting from a polyimidazopyrrolone prepolymer powder, prepared as described in Example I, and from a powder of a polyamideimide sold by Amoco under the trade name "Torlon". For this, 50 grms. of the prepolymer powder and 50 grms. of the "Torlon" powder are mixed intimately. To the mixture obtained, 15 grms. of polytetrafluoroethylene are added in a finely divided state. The resulting mixture is moulded under pressure at a temperature above 300° C. to produce test pieces.

The test pieces obtained are subjected to wear tests under vacuum and at ambient temperature as well as in the atmosphere and under vacuum at 300° C.

A first test conducted under ultra vacuum of $2\times10^{-9}$ mm. of mercury, at ambient temperatures for a period of 138 hours, using a shaft Z 100 CD 17 (with a degree of roughness of 0.11 microns) rotating at a speed of 0.8 meters a second whilst applying various loads caused the following losses of material (cubic mm. of wear):

| load, grms. | 175 | 250 | 500 |
|---|---|---|---|
| wear, mm.$^3$ | 0.08 | 0.14 | 0.36 |

The composite friction material is also very stable at high temperatures under vacuum and in the atmosphere. Thus, at the end of 47 hours at 300° C., the loss in weight (in percentage) is 2.2% under a vacuum of $10^{-3}$ (mm. of mercury) and 6.4% in the atmosphere. For the purpose of comparision, the composite material RINEL 1050 which can be bought on the market (it is sold by Rhone-Poulenc) treated under the same test conditions gave weight losses of 4.5 and 8%, respectively.

We claim:
1. A solid polymer consisting essentially of recurring units having the formula:

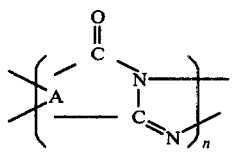

wherein A is a tetravalent organic radical selected from the group consisting of an aromatic radical, a heterocyclic aromatic radical and a heterocyclic radical containing at least six carbon atoms and including up to four hetero atoms selected from the group consisting of O, S, and N atoms; wherein the four chain forming bonds of the radical A are in two pairs with the bonds in each pair being ortho to one another; wherein n is a high integer.

2. The polymer of claim 1 wherein the radical A is selected from the group consisting of

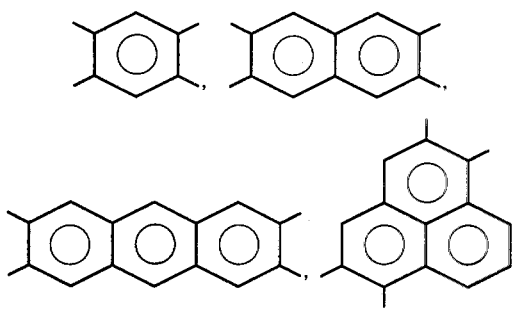

and the isomers thereof;

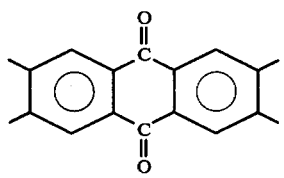

and its isomers;

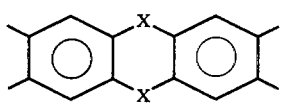

and its isomers, wherein X is —O—, —S—, or >NH;

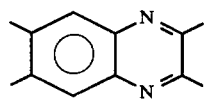

and its isomer;

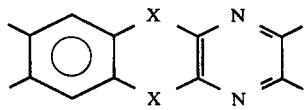

and its isomers, wherein X is —O—, —S—, or >NH; and

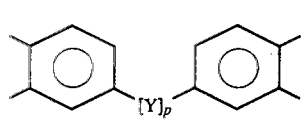

and its isomers, wherein Y is a bivalent atom or a bivalent organic radical, and p is 0 or 1.

3. The polymer of claim 1 wherein the radical A is

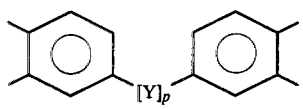

and its isomers, wherein Y is a bivalent atom or a bivalent organic radical, and p is 0 or 1.

4. The polymer of claim 3, wherein Y is selected from the group consisting of an alkylene group having from one to three carbon atoms, a perfluoroalkylene group having from one to three carbon atoms,

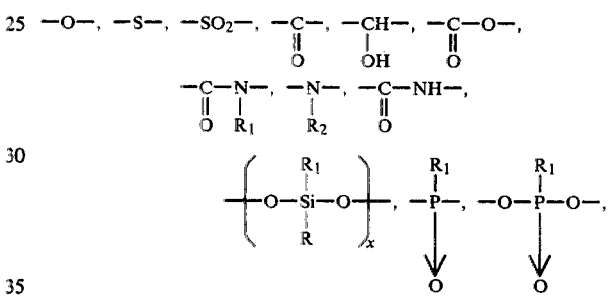

a bivalent cycloaliphatic group having three to twenty carbon atoms, a bivalent aromatic group, and a heterocyclic or aromatic heterocyclic group; wherein $R_1$ and $R_2$ each represent an alkyl group or alkoxy group having at most twenty carbon atoms, or a phenyl or phenoxy group; and wherein x is a whole number not greater than 3.

5. A prepolymer for use in the production of the polymer of claim 1, characterized by the presence of recurring units having the formula

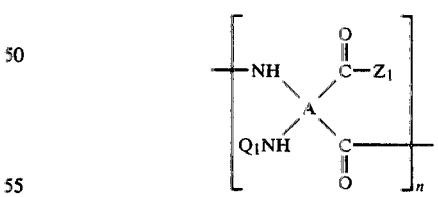

wherein A is as specified in claim 1; wherein $Q_1$ is a protecting group for an amino function; wherein $Z_1$ is an organic monovalent radical selected from the group consisting of —OH, a hydroxyl derivative and a halogen atom; and wherein n is an integer that is sufficiently high for the prepolymer to have film forming properties.

6. The prepolymer of claim 5 wherein $Z_1$ is a hydroxyl derivative, said derivative being —$OR_3$, wherein $R_3$ is alkyl, phenyl, or benzyl.

7. The polymer of claim 3 wherein Y is selected from the group consisting of an alkylene group having from one to three carbon atoms, a perfluoroalkylene group having from one to three carbon atoms,

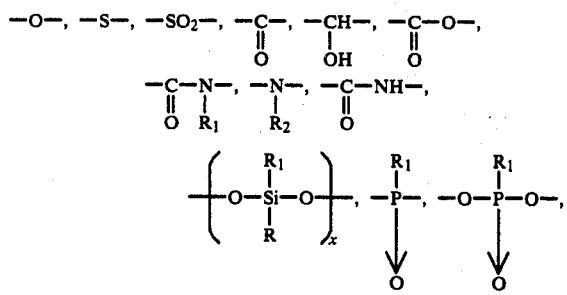

a bivalent cycloaliphatic group having three to twenty carbon atoms and a bivalent aromatic group; wherein $R_1$ and $R_2$ each represent an alkyl group or alkoxy group having at most twenty carbon atoms, or a phenyl or phenoxy group; and wherein x is a whole number not greater than 3.

8. A solid polymer according to claim 1, in the form of a film.

9. A solid polymer according to claim 1 in admixture with a fibrous reinforcement.

10. A process for preparing the polymer of claim 1, said process comprising homopolymerisation by autocondensation of a single monomer selected from the group consisting of

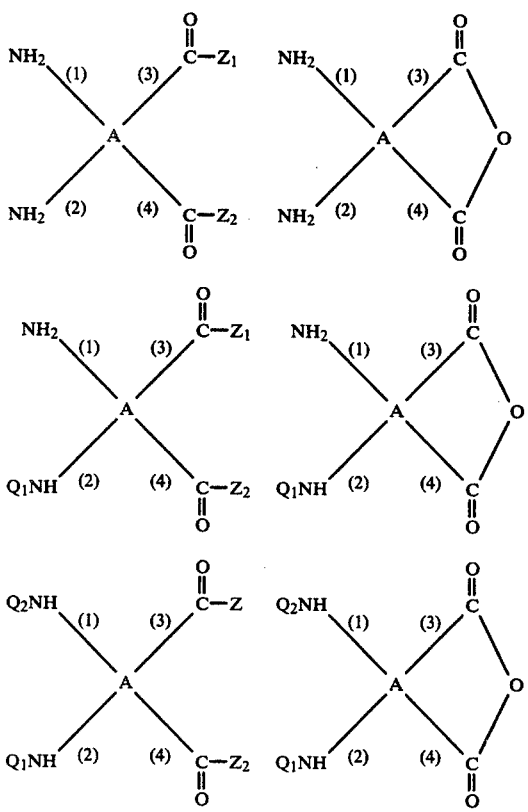

and salts thereof; wherein the radical A is as defined in claim 17; wherein $Q_1$ and $Q_2$ represent protecting groups which may be the same or different, for an amino function; wherein $Z_1$ and $Z_2$ each represent an organic monovalent radical selected from the group consisting of —OH, a hydroxyl derivative and a halogen atom; and wherein bonds (1) and (2) of radical A are carried by adjacent carbon atoms of radical A, and bonds (3) and (4) of radical A are carried by adjacent carbon atoms of radical A.

11. The process of claim 10 wherein the organic radical represented by $Z_1$ and $Z_2$ is a hydroxyl derivative, said derivative being —$OR_3$, wherein $R_3$ is alkyl, phenyl, or benzyl.

12. The process of claim 10 comprising a first and second step, said first step being a polycondensation of said monomer in an inert organic solvent to obtain a soluble film-forming prepolymer, and said second step being an intramolecular cyclization step under heat or by the action of a chemical dehydrating agent, whereby the prepolymer is converted to the polymer.

13. The process of claim 10 comprising reducing into an $NH_2$ group, the $NO_2$ group of a monomer selected from the group consisting of

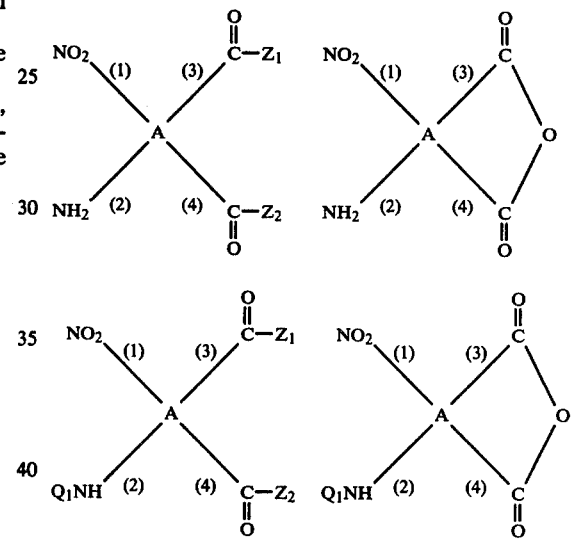

and salts thereof; said reducing step being preliminary to or simultaneous with said homopolymerization step.

14. The process of claim 10 wherein the radical A of said monomer is

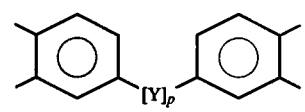

and its isomers; wherein Y is a bivalent atom or a bivalent organic radical, and p is 0 or 1.

15. The process of claim 14 wherein Y is selected from the group consisting of an alkylene group having from one to three carbon atoms, a perfluoroalkylene group having from one to three carbon atoms,

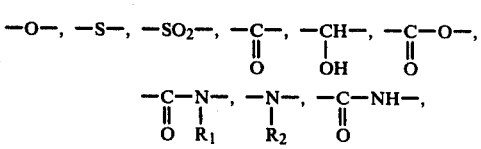

-continued

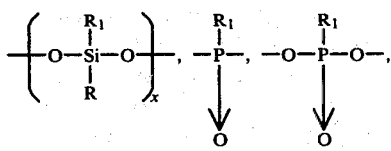

a bivalent cycloaliphatic group having three to twenty carbon atoms, a bivalent aromatic group, and a heterocyclic or aromatic heterocyclic group; wherein $R_1$ and $R_2$ each represent an alkyl group or alkoxy group having at most twenty carbon atoms, or a phenyl or phenoxy group; and wherein x is a whole number not greater than 3.

16. A process according to claim 15, wherein said monomer has the formula:

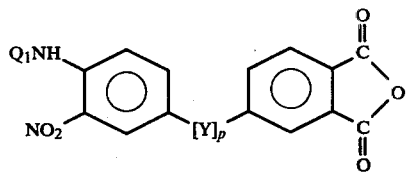

wherein Y is as defined in claim 15, wherein p is 0 or 1, and wherein $Q_1$ is a protecting group for an amino function.

17. The process of claim 13 wherein the reducing step and the homopolymerization are effected simultaneously by hydrogenation under a hydrogen pressure of at least 10 atmospheres, in the presence of a catalyst and of an agent which absorbs the water produced by the homopolymerization reaction.

18. The process of claim 14 wherein Y is selected from the group consisting of an alkylene group having from one to three carbon atoms, a perfluoroalkylene group having from one to three carbon atoms,

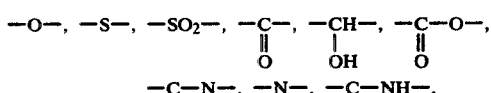

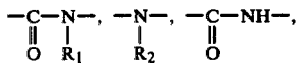

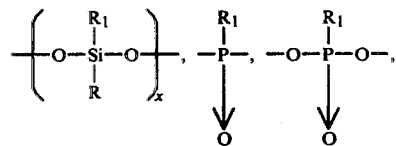

a bivalent cycloaliphatic group having three to twenty carbon atoms and a bivalent aromatic group; wherein $R_1$ and $R_2$ each represent an alkyl group or alkoxy group having at most twenty carbon atoms, or a phenyl or phenoxy group; and wherein x is a whole number not greater than 3.

* * * * *